2 Sheets—Sheet 1.
H. T. FUSTON & W. G. CUMMINS.
Horse Detacher.
No. 229,116. Patented June 22, 1880.
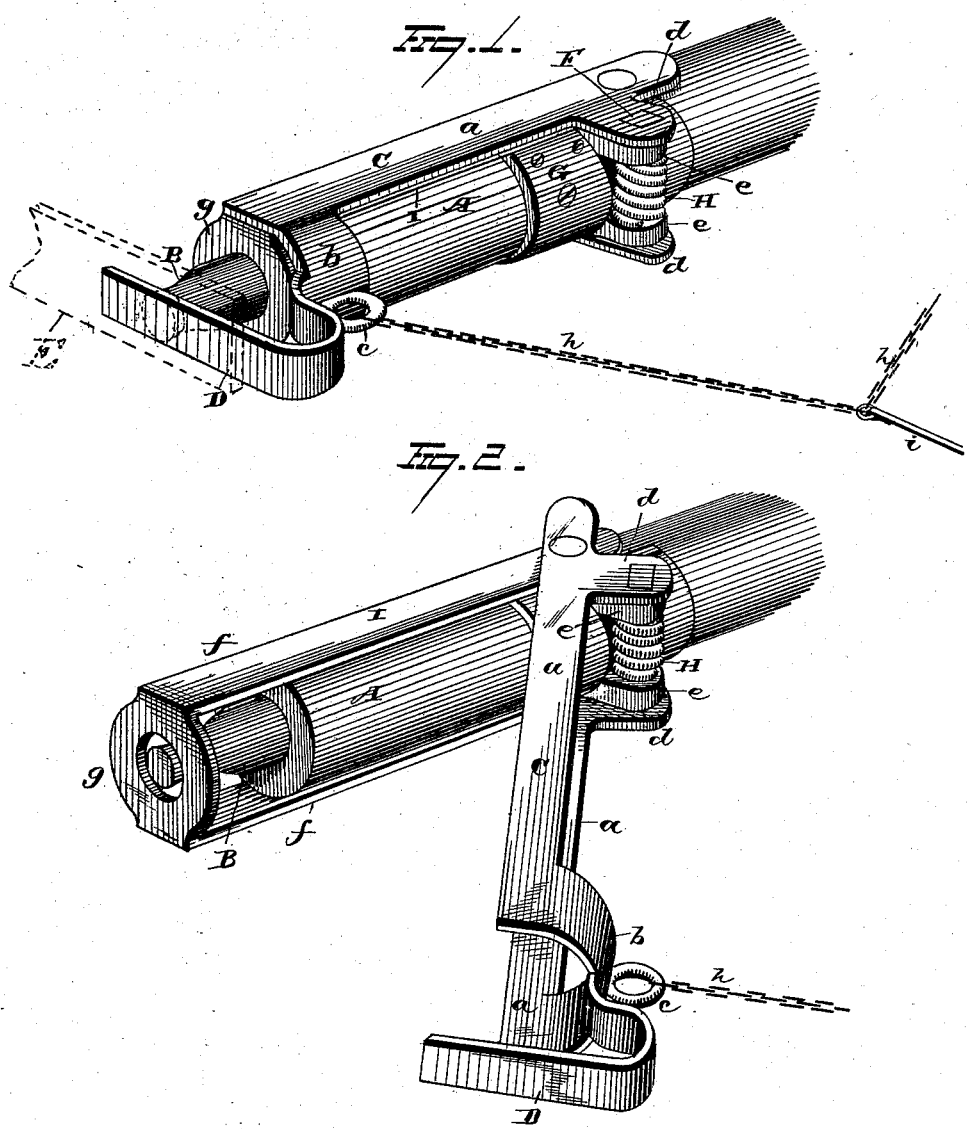
WITNESSES
E Nottingham
A W Bright
INVENTOR
H T Fuston
and
W G Cummins
By H A Seymour ATTORNEY

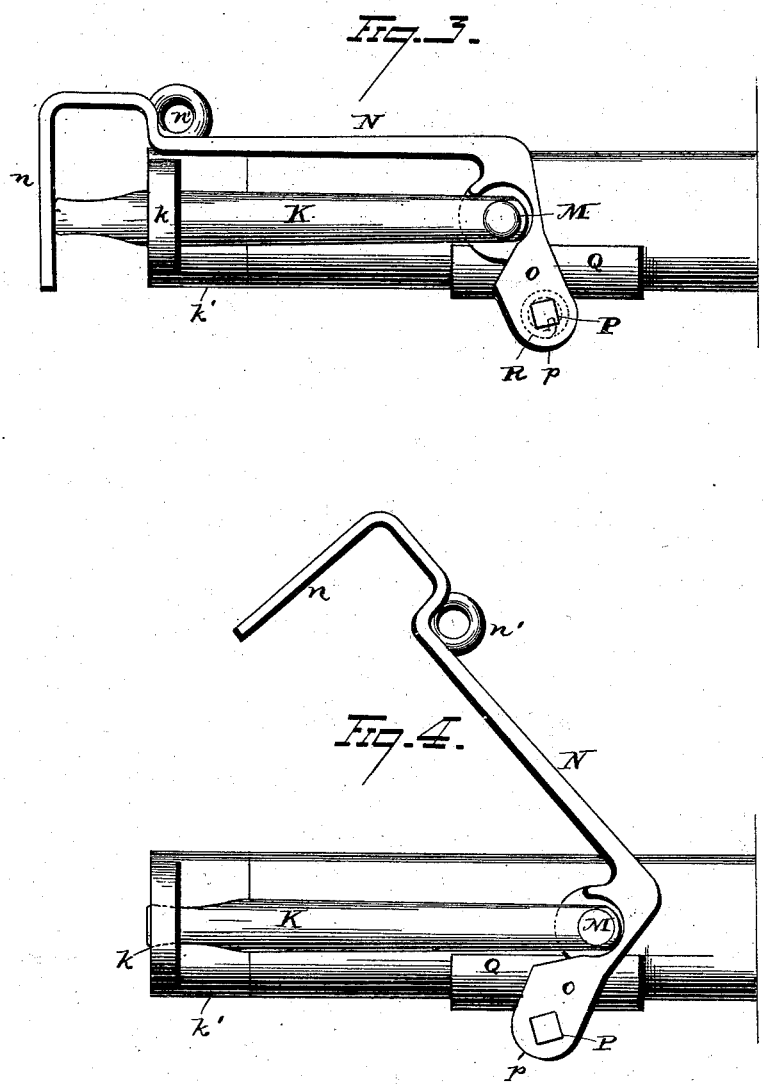

UNITED STATES PATENT OFFICE.

HENDERSON T. FUSTON AND WILLIAM G. CUMMINS, OF McMINNVILLE, TENNESSEE.

HORSE-DETACHER.

SPECIFICATION forming part of Letters Patent No. 229,116, dated June 22, 1880.

Application filed January 14, 1880.

*To all whom it may concern:*

Be it known that we, HENDERSON T. FUSTON and WILLIAM G. CUMMINS, of McMinnville, in the county of Warren and State of Tennessee, have invented certain new and useful Improvements in Horse-Detachers; and we do hereby declare the following to be a full, clear, and exact description of the invention, such as will enable others skilled in the art to which it pertains to make and use it, reference being had to the accompanying drawings, which form part of this specification.

Our invention relates to an improvement in horse-detachers, the object being to provide the whiffletree of a vehicle with an attachment whereby the traces may be readily detached from the ends of the whiffletree and the horse released from the vehicle; and to this end the invention consists, first, in the combination, with a whiffletree, of a reciprocating trace-detaching rod and a trace-guard pivoted to the whiffletree or bearing secured thereto, and having the trace-detaching rod pivoted or hinged thereto, whereby, a swinging movement being imparted to the trace-guard, the latter is moved away from the end of the trace and a simultaneous reciprocating movement is imparted to the detaching-rod, which operates to release the traces from the ends of the whiffletree.

Our invention further consists in the several details in construction and combinations of parts, as will hereinafter be explained and pointed out in the claims.

In the accompanying drawings, Figure 1 is a perspective view of one form of horse-detaching attachment embodying our invention, the parts being shown in position for retaining the trace in engagement with the ends of the whiffletree. Fig. 2 is a similar view, showing the parts when operated to detach the traces and release the horse. Figs. 3 and 4 are similar views of a modification.

A represents a whiffletree having the trace-pins B inserted and rigidly secured in its opposite ends. To each end of the whiffletree is attached a detaching device of the following construction: C is a trace-guard consisting of the arms *a a*, their outer ends being connected by a semicircular loop, *b*, from which latter extends the shield D, the latter being bent or formed at practically right angles to the trace-pin, and thereby affording a firm and extended bearing against the outer side of the trace E.

The trace-guard is provided near its outer end with a ring, *c*, for the attachment of a cord, chain, or strap for actuating the detaching apparatus, when desired, and readily releasing the trace from the end of the whiffletree.

The inner ends of the arms *a a* are provided with short arms *d d*, which are rigidly secured to the opposite ends of the pin F, the latter being journaled in the perforated lugs *e e* of the clip-plate G, which is attached to the whiffletree by rivets or screws.

H is a spiral spring surrounding the pin F, one end of the spring being secured to the pin, while its other end is firmly secured to the whiffletree, clip-plate, or other fixed object, whereby the spring serves to retain the trace-guard in its closed position.

I represents a trace-detacher consisting of the arms *f f*, provided with a perforated plate or disk, *g*, the latter constructed to fit over the trace-pin B and be reciprocated thereon. The ends of the arms *f f* are pivoted to the rear ends of the arms *a a* of the trace-guard, whereby the latter is, in effect, a bell-crank lever with its pivotal point at one side of the whiffletree, this arrangement insuring ample leverage for operating the trace-detacher, as will be explained.

When the trace-guards are swung around rearwardly against the force of the spiral springs H the traces may be readily attached to the trace-pins B, and by releasing the end of the trace-guard the latter will be forced outwardly again by its spring, thus causing the shield D to move around opposite the outer side of the trace and prevent the latter from becoming displaced.

As an ordinary pin or lug is employed for holding the trace, the latter need only have comparatively small perforations formed therein, and hence are not materially weakened, as is the case where elongated heads are necessary on the trace-pins.

Cords, chains, or straps *h h* are secured at one end to the rings c c, and their other ends to a cord or strap, i, which is attached to the vehicle, to be in easy reach of the driver. Should the horse become frightened, or should it become desirable for any reason to release the horse from the vehicle, it is readily done by simply pulling on cord i, which operates to swing the trace-guards away from the ends of the traces, and at the same time to impart an outward reciprocating movement to the trace-detachers and force the traces off from the trace-pins attached to the ends of the whiffletree.

In Figs. 3 and 4 we have represented another form of construction of detaching device embodying the principle of our invention. In this latter form the trace-pins are dispensed with, the traces being secured to the outer ends of the trace-detacher K, the outer ends of which are held in place by means of a perforated lug, k, formed on the ferrule k', or a staple may be secured to the end of the whiffletree, if desired, for this purpose.

The inner ends of the trace-detacher are pivoted or hinged at M to the trace-guard N, which is provided with a guard-plate or shield, n, on its outer end, and a ring, n', for the attachment of a cord. The inner end of the trace-guard is formed with an arm, o, the end of which is rigidly secured to one end of a pin or bolt, P, which latter is supported in perforated lugs p p formed on the clip-plate Q. A spiral spring, R, encircles the pin P, one end of the spring being secured to the pin and the other to the clip-plate or whiffletree, this spring tending to retain the trace-guard in its closed position.

By swinging the trace-guards rearwardly the trace-detachers are retracted or drawn toward each other, thereby disengaging their outer ends from the traces. By pivoting or hinging the inner ends of the trace-guards at points outside the whiffletrees the desired leverage is secured for detaching the traces with a slight expenditure of power.

It will be observed that our improved horse-detacher is the embodiment of simplicity of construction; and as it is composed of few parts, arranged in the manner described, it is not liable to become impaired, and is most effectual in use.

It is evident that slight changes may be made in the construction and relative arrangement of parts without departing from the spirit of our invention, and hence we do not limit ourselves to the exact construction shown and described.

We are aware that a reciprocating trace-detacher has been secured in guideways attached to the whiffletree and retained against displacement by means of a spiral spring surrounding a shank on the rear end of the detaching device, and a pivoted guard arranged to have its short arm engage with a projection in the trace-detaching device and move the latter outwardly when the guard is turned rearwardly, and hence we would have it understood that we make no claim to such construction or combination of parts, as in our device the trace-detacher is pivoted at its inner end to the guard and moved in unison therewith.

Having fully described our invention, what we claim as new, and desire to secure by Letters Patent, is—

1. The combination, with a pivoted trace-guard, of a trace-detacher pivoted or hinged at its inner end to the trace-guard, substantially as set forth.

2. The combination, with a reciprocating trace-detaching device, connected with the outer end of a whiffletree by means of a perforated lug or staple, of a pivoted trace-guard having the inner end of the trace-detaching device pivoted thereto, substantially as set forth.

3. The combination, with a whiffletree having trace-pins secured to its opposite ends, of trace-detaching devices provided with eyes or rings on their outer ends, which receive the operating cords or straps, and trace-guards, the inner ends of which are pivoted to clip-plates on the whiffletree and have the trace-detaching rods pivoted thereto, substantially as set forth.

4. The combination, with a trace-detaching device, of a trace-guard pivoted at one side of the whiffletree and having the trace-detacher pivoted thereto, substantially as set forth.

5. The combination, with a trace-detaching device, of a trace-guard having the trace-detacher pivoted thereto, said trace-guard being secured to a pin journaled in lugs formed on a clip-plate secured to the whiffletree, and a spring encircling said pin and adapted to prevent the accidental displacement of the trace-guard, substantially as set forth.

In testimony that we claim the foregoing we have hereunto set our hands this 16th day of December, 1879.

HENDERSON T. FUSTON.
WILLIAM G. CUMMINS.

Witnesses:
JOHN A. COPELAND,
FRANK SPURLOCK.